US012670263B2

(12) United States Patent
Hou et al.

(10) Patent No.: US 12,670,263 B2
(45) Date of Patent: Jun. 30, 2026

(54) LARGE LANGUAGE MODEL-BASED VULNERABILITY REMEDIATION ACTION DESCRIPTIONS

(71) Applicant: Palo Alto Networks, Inc., Santa Clara, CA (US)

(72) Inventors: Yantian Hou, Milpitas, CA (US); Yilin Zhao, Sunnyvale, CA (US); Gong Cheng, Sunnyvale, CA (US); Kanimozhi Kalaichelvan, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 156 days.

(21) Appl. No.: 18/790,060

(22) Filed: Jul. 31, 2024

(65) Prior Publication Data

US 2026/0037635 A1 Feb. 5, 2026

(51) Int. Cl.
G06F 21/57 (2013.01)
(52) U.S. Cl.
CPC ...... G06F 21/577 (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 12,487,871 | B2 * | 12/2025 | Danino | G06F 11/008 |
| 12,518,023 | B1 * | 1/2026 | Guo | G06F 21/577 |
| 2018/0336356 | A1 * | 11/2018 | Papaxenopoulos | G06F 8/65 |
| 2024/0411894 | A1 * | 12/2024 | Shua | G06F 21/577 |
| 2025/0267162 | A1 * | 8/2025 | Benefield | H04L 41/0813 |

* cited by examiner

*Primary Examiner* — Fatoumata Traore
(74) *Attorney, Agent, or Firm* — Gilliam IP PLLC

(57) ABSTRACT

A vulnerability documentation system detects vulnerabilities having outdated or undocumented formatted descriptions for corresponding remediation actions. A web crawler crawls the Internet for configuration data for software/firmware affected by the detected vulnerabilities and descriptive content for the remediation actions. The vulnerability documentation system prompts and LLM with a prompt for each detected vulnerability comprising instructions to generate a formatted description for remediation actions using the crawled configuration data/descriptive content. The vulnerability documentation system then populates natural language descriptions of remediation actions from the formatted descriptions and pushes the natural language descriptions to affected devices.

20 Claims, 5 Drawing Sheets

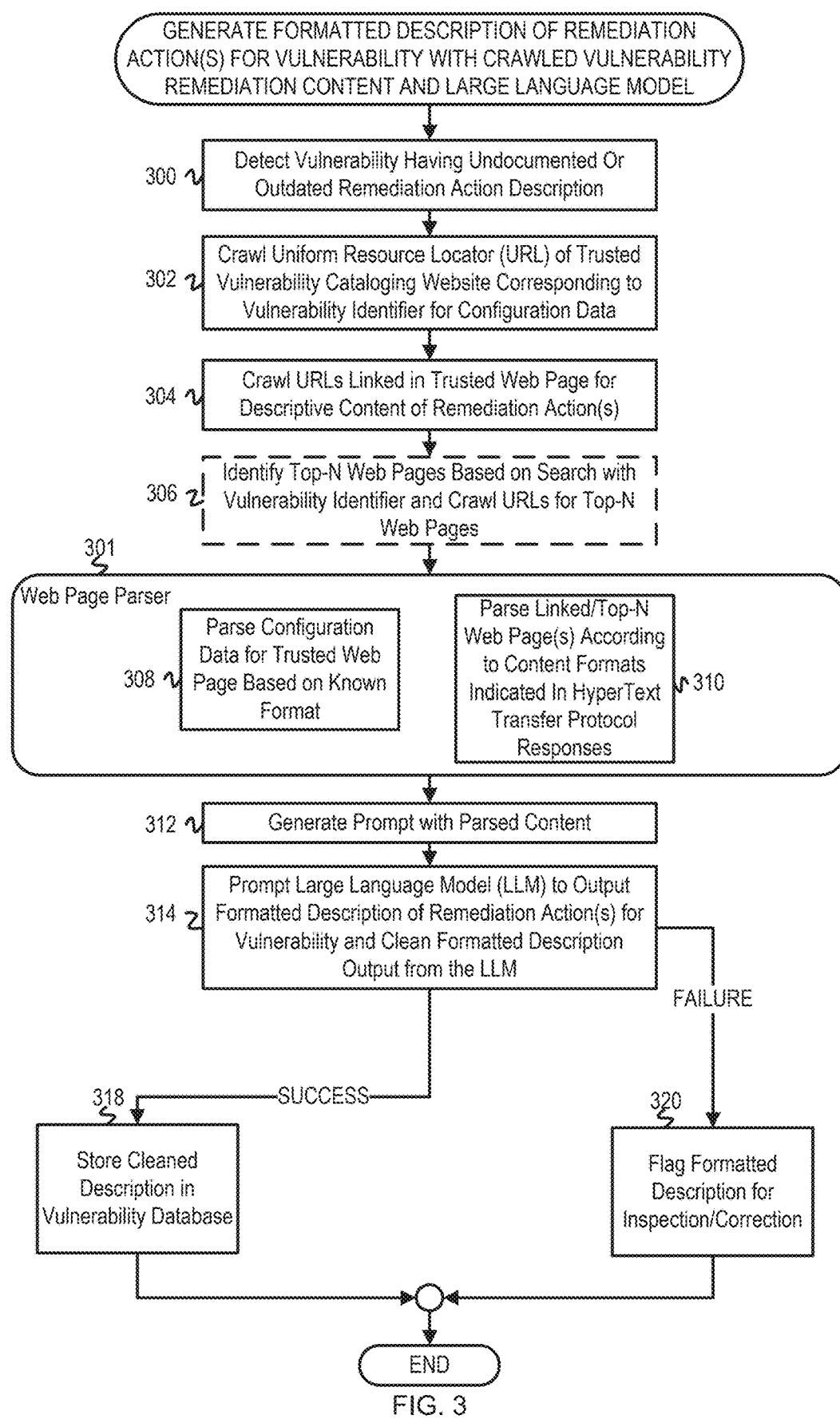

GENERATE FORMATTED DESCRIPTION OF REMEDIATION ACTION(S) FOR VULNERABILITY WITH CRAWLED VULNERABILITY REMEDIATION CONTENT AND LARGE LANGUAGE MODEL

300   Detect Vulnerability Having Undocumented Or Outdated Remediation Action Description 302   Crawl Uniform Resource Locator (URL) of Trusted Vulnerability Cataloging Website Corresponding to Vulnerability Identifier for Configuration Data 304   Crawl URLs Linked in Trusted Web Page for Descriptive Content of Remediation Action(s)

306   Identify Top-N Web Pages Based on Search with Vulnerability Identifier and Crawl URLs for Top-N Web Pages

301

Web Page Parser

308   Parse Configuration Data for Trusted Web Page Based on Known Format

310   Parse Linked/Top-N Web Page(s) According to Content Formats Indicated In HyperText Transfer Protocol Responses 312   Generate Prompt with Parsed Content 314   Prompt Large Language Model (LLM) to Output Formatted Description of Remediation Action(s) for Vulnerability and Clean Formatted Description Output from the LLM

FAILURE

SUCCESS

318   Store Cleaned Description in Vulnerability Database

320   Flag Formatted Description for Inspection/Correction

END

FIG. 3

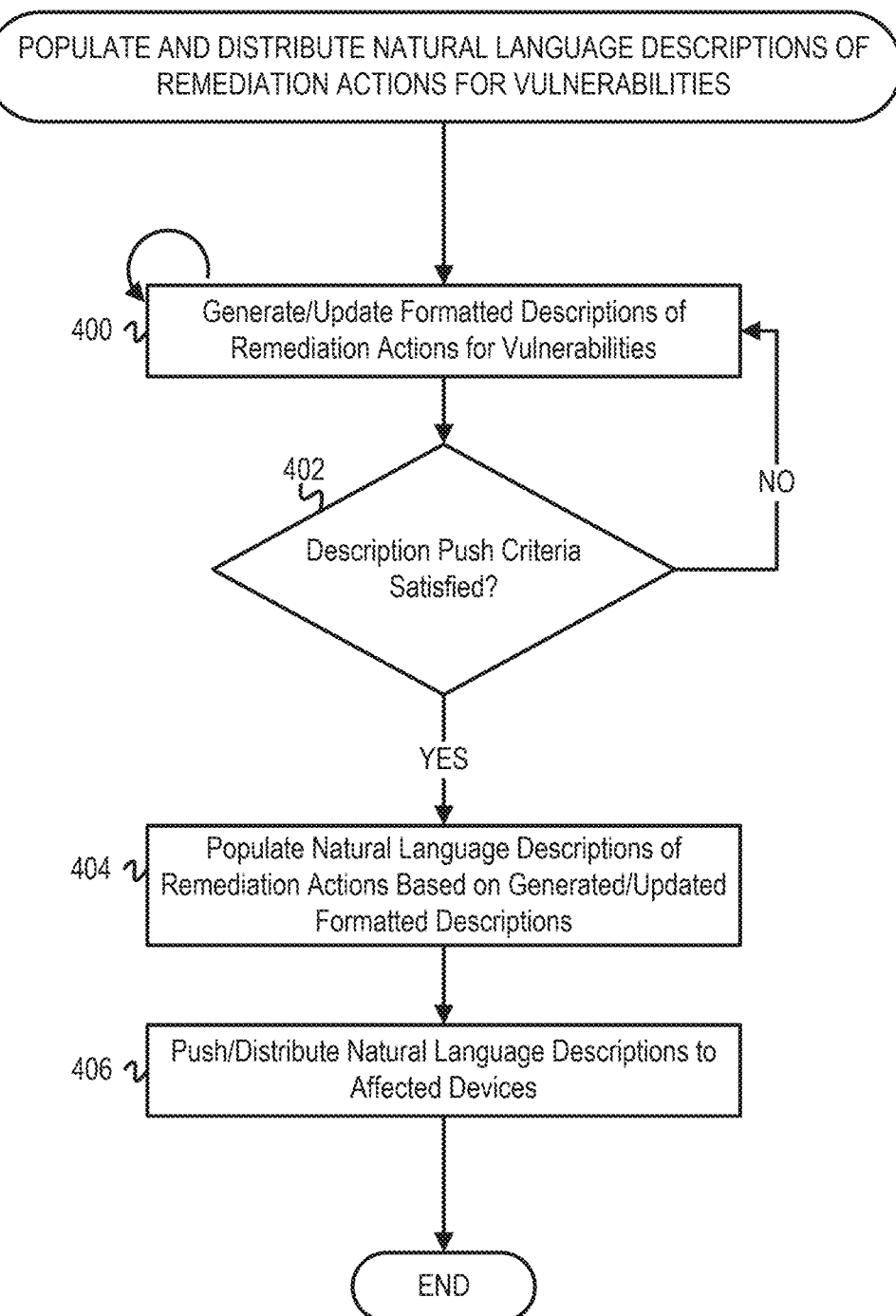

POPULATE AND DISTRIBUTE NATURAL LANGUAGE DESCRIPTIONS OF REMEDIATION ACTIONS FOR VULNERABILITIES

400  Generate/Update Formatted Descriptions of Remediation Actions for Vulnerabilities 402  Description Push Criteria Satisfied?

NO

YES

404  Populate Natural Language Descriptions of Remediation Actions Based on Generated/Updated Formatted Descriptions 406  Push/Distribute Natural Language Descriptions to Affected Devices

END

FIG. 4

LARGE LANGUAGE MODEL-BASED VULNERABILITY REMEDIATION ACTION DESCRIPTIONS

BACKGROUND

The disclosure generally relates to data processing (e.g., CPC subclass G06F) and to computing arrangements based on specific computational models (e.g., CPC subclass G06N).

The Stanford Institute for Human-Centered Artificial Intelligence created an interdisciplinary initiative named the Center for Research on Foundation Models. They coined the term "foundation models" to refer to machine learning models "trained on broad data at scale such that they can be adapted to a wide range of downstream tasks." Some models considered foundation models include BERT, GPT-4, Codex, and Llama. Foundation models are based on artificial neural networks including generative adversarial networks (GANs), transformers, and variational encoders.

A "Transformer" was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a foundational model, and there has been subsequent research in similar Transformer-based sequence modeling. Architecture of a Transformer model typically is a neural network with transformer blocks/layers, which include self-attention layers, feed-forward layers, and normalization layers. The Transformer model learns context and meaning by tracking relationships in sequential data. Some large language models (LLMs) are based on the Transformer architecture. An LLM is "large" because the training parameters are typically in the billions. LLMs can be pre-trained to perform general-purpose tasks or tailored to perform specific tasks. Tailoring of language models can be achieved through various techniques, such as prompt engineering and fine-tuning. For instance, a pre-trained language model can be fine-tuned on a training dataset of examples that pair prompts and responses/predictions. Prompt-tuning and prompt engineering of language models have also been introduced as lightweight alternatives to fine-tuning. Prompt engineering can be leveraged when a smaller dataset is available for tailoring a language model to a particular task (e.g., via few-shot prompting) or when limited computing resources are available. In prompt engineering, additional context may be fed to the language model in prompts that guide the language model as to the desired outputs for the task without retraining the entire language model or changing the weights of the language model.

BRIEF DESCRIPTION OF THE DRAWINGS

Embodiments of the disclosure may be better understood by referencing the accompanying drawings.

FIG. 3 is a flowchart of example operations for generating a formatted description of a remediation action(s) for a vulnerability with extracted vulnerability remediation content and an LLM.

FIG. 4 is a flowchart of example operations for populating and distributing natural language descriptions of remediation actions for vulnerabilities.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

New cybersecurity vulnerabilities that range from the thousands to hundreds of thousands are constantly detected. Moreover, each vulnerability can affect multiple software and firmware configurations. Cataloging patch fixes for vulnerabilities represents a logistical challenge for cybersecurity experts. As vulnerabilities remain undocumented, cybersecurity systems that notify users of potential vulnerabilities at devices lack interpretable recommendations that inform remediation action for those vulnerabilities. The present disclosure proposes a pipeline for generating formatted descriptions of remediation actions for vulnerabilities by crawling URLs for web pages associated with the vulnerabilities and prompting an LLM to generate the formatted descriptions using the crawled web page data.

When a vulnerability database detects a vulnerability with undocumented or outdated remediation actions, the detection triggers a web crawler to crawl URLs for web pages associated with an identifier of the vulnerability. The crawled web pages include a web page for the vulnerability at a trusted vulnerability cataloging website, e.g., the national vulnerability database (NVD) website for the National Institute of Standards and Technology (NIST) and reference web pages for vendors of products exposed to the vulnerability. A web page parser receives HyperText Transfer Protocol (HTTP) responses from crawling with the web crawler and parses content therein to input into an engineered prompt template. A prompt generator inserts the parsed content into the prompt template to generate a prompt that instructs an LLM to generate formatted descriptions of remediation actions for the vulnerability. Finally, a cleaning module verifies correctness of format and consistency of fields (i.e., version numbers) in the formatted descriptions before they are stored in the vulnerability database. The formatted descriptions are then used to populate natural language descriptions of remediation actions for identified vulnerabilities at devices. Using LLMs to generate formatted descriptions is both efficient and scalable by avoiding manual inspection of online vulnerability descriptions. Moreover, the recommended remediation actions in the formatted descriptions have high accuracy and integrity, and this web crawling approach allows for uncovering in-depth insights into vulnerability remediations. This approach is extendible, allowing for easy integration of additional modules for processing, formatting, and presentation of additional/alternative remediation action recommendations and corresponding insights.

Example Illustrations

Figure 1:
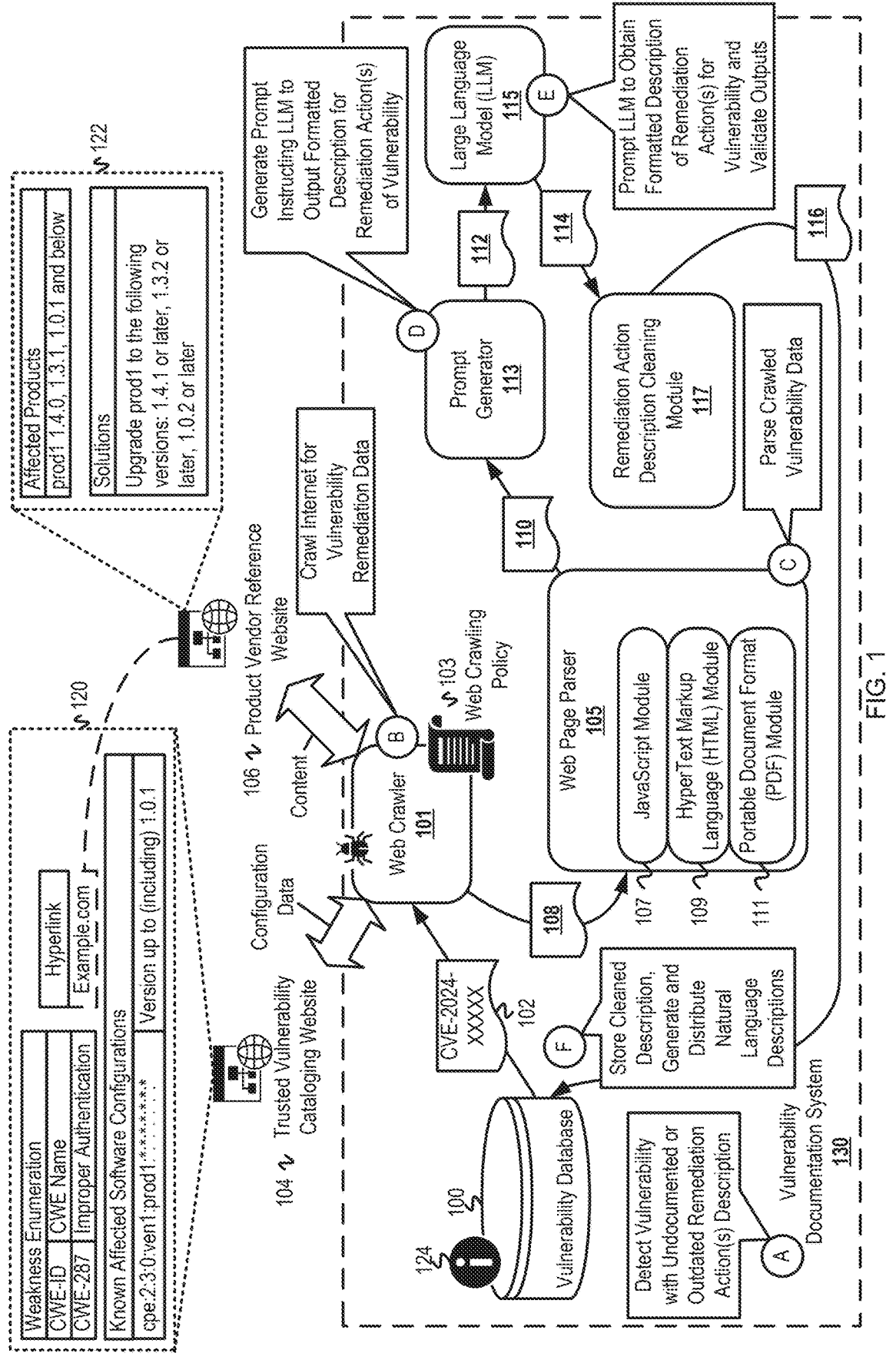
FIG. 1 is a schematic diagram for generating a formatted description of a remediation action (a) for a vulnerability by prompting an LLM with content for the vulnerability obtained from crawling the Internet.

FIG. 1 is a schematic diagram for generating a formatted description of a remediation action(s) for a vulnerability by prompting an LLM with content for the vulnerability that has been obtained from crawling the Internet. Based on detecting vulnerabilities with undocumented or outdated remediation actions, a vulnerability documentation system 130 managing a vulnerability database 100 communicates identifiers of the vulnerabilities to a web crawler 101. The web crawler 101 crawls URLs for web pages associated with the vulnerabilities and communicates web page data to a web page parser 105. The web page parser 105 parses the web page data into a format acceptable for a prompt generator 113 and the prompt generator 113 generates prompts to an LLM 115 comprising task instructions to generate formatted descriptions of remediation actions for the vulnerabilities. A remediation action description cleaning module (cleaning module) 117 then cleans the formatted descriptions output by the LLM 115 and communicates the cleaned descriptions to the vulnerability database 100 for storage.

FIG. 1 is annotated with a series of letters A-F depicting stages. Each stage represents one or more operations. Although these stages are ordered for this example, the stages illustrate one example to aid in understanding this disclosure and should not be used to limit the claims. Subject matter falling within the scope of the claims can vary from what is illustrated.

At stage A, the vulnerability documentation system 130 detects a vulnerability 124 that has undocumented and/or outdated remediation in the vulnerability database 100. The vulnerability database 100 can be a centralized database of a cybersecurity organization that catalogs metadata of vulnerabilities. For instance, the vulnerability database 100 can store metadata fields such as Common Vulnerability Scoring System (CVSS) scores, vulnerability type, vulnerability source, severity, Exploit Prediction Scoring System (EPSS) score percentiles, exploit status, and remediation action descriptions. While the present disclosure is concerned with cataloging recommendations for remediation actions of vulnerabilities, the web crawler 101 can additionally crawl for these metadata fields for comprehensive logging of vulnerabilities in the vulnerability database 100.

A remediation action description comprises, for each vendor/product pair affected by a vulnerability, a list of product versions or product version ranges affected by the vulnerability and a list of corresponding patch product versions that remediate the vulnerability. The web crawler 101 can periodically crawl websites having trusted vulnerability catalogs for vulnerability metadata to detect Common Vulnerabilities and Exposures (CVE) identifiers for newly seen vulnerabilities and/or existing vulnerabilities that have been updated/changed. This crawling can retrieve configuration data for software/firmware affected by the vulnerabilities. Any of the operations for crawling the Internet for this configuration data described herein can alternatively be described as retrieving this data from the vulnerability database 100 or other storage.

When the vulnerability documentation system 130 receives an indication for a new or updated vulnerability from the web crawler 101, the vulnerability documentation system 130 inspects the database entry to determine whether a remediation action(s) is described therein (e.g., with affected version number fields and patch version number fields to remediate the vulnerability). Based on detecting the vulnerability 124 as not having a described remediation action, the vulnerability documentation system 130 communicates an identifier 102 "CVE-2024-XXXXX" for the vulnerability 124 to the web crawler 101.

At stage B, the web crawler 101 crawls the Internet for data related to the remediation of the vulnerability 124 according to a web crawling policy 103. The web crawling policy 103 at least indicates crawling a trusted vulnerability cataloging website 104 (e.g., the NVD website) for software/firmware configuration data at a web page associated with the identifier 102 and a product vendor reference website 106 that describes remediation actions for the vulnerability 124. In the example in FIG. 1, the web crawler 101 crawls a URL for a web page of the trusted vulnerability cataloging website 104 having rendering 120 that indicates a weakness enumeration of a weakness associated with the vulnerability 124 with common weakness enumeration (CWE) identifier 287 and name "Improper Authentication". The rendering 120 also indicates configuration data under the header "known affected software configurations" for the vulnerability 124 associated with a vendor/product having Common Platform Enumeration (CPE) identifier "cpe:2:3:0:ven1:prod1:*:*:*:*:*:*:*" and version number less than or equal to 1.0.1, and a hyperlink "example.com". The rendering 120 indicates the hyperlink "example.com" which is a web page of the product vendor reference website 106 describing a remediation action(s) for the vulnerability 124.

Based on identifying the hyperlink for "example.com", the web crawler 101 crawls the URL of the product vendor reference website 106. Rendering 122 for this web page indicates that the affected product is "prod1" with versions 1.4.0, 1.3.1, and 1.0.1 and below. The rendering 122 also indicates a description of remediation actions under the header "Solutions" that recommend upgrading version 1.4.0 to version 1.4.1, upgrading version 1.3.1 to version 1.3.2, and upgrading versions less than 1.0.1 to version 1.0.2. The web page for the trusted vulnerability cataloging website 104 may indicate multiple URLs therein (for instance, when a vulnerability affects multiple vendors and/or products), and the web crawler 101 crawls each of the URLs for additional remediation content.

In some embodiments, the web crawling policy 103 can specify that the web crawler 101 crawl additional URLs than the URL for the web page at the trusted vulnerability cataloging website 104 and the reference URL(s) therein. For instance, the web crawler 101 can instantiate a search engine or use a public search engine (not depicted) using a query with the identifier 102 and can crawl content from the top-N (e.g., N=3) web pages most relevant to the identifier 102 according to results of the search engine. This has the benefit of resulting in more descriptive prompts at the expense of slower prompt generation and exposure to malicious attacks when an attacker injects malicious content into the top-N web pages for a vulnerability. Once the web crawler 101 has crawled all URLs for all web pages related to the vulnerability, the web crawler 101 communicates HTTP responses 108 from the crawling to the web page parser 105.

At stage C, the web page parser 105 parses content in the HTTP responses 108 to obtain vulnerability content 110 to be used by the prompt generator 113. The web page parser 105 comprises a JavaScript® module 107, a HyperText Markup Language (HTML) module 109, and a Portable Document Format (PDF) module 111. The modules 107, 109, and 111 are configured to receive as input sections of the HTTP responses 108 comprising JavaScript code, HTML natural language content, and PDF files, respectively. For instance, each section of the HTTP responses 108 can be extracted by the web page parser 105 according to delimiters such as HTML element tags. Each of the modules 107, 109, 111 applies parsing operations such as addition, removal, and/or alteration of syntax and natural language processing according to corresponding data types.

Additionally, the web page parser 105 is configured to parse the format of vulnerabilities cataloged at web pages of the trusted vulnerability cataloging website 104. The web page parser 105 segregates each HTTP response in the HTTP responses 108 from the trusted vulnerability cataloging website 104 to handle separately. For the example in FIG. 1, the web page parser 105 is configured to know that product versions affected by the vulnerability 124 may be indicated in this HTTP response in a table element under the header "Known Affected Software Configurations" having entries comprising CPE identifiers for vendor/product pairs and corresponding ranges of affected versions. The web page parser 105 may then extract the vendor and product identifiers from the CPE identifiers and version ranges accordingly and insert them into corresponding fields in the vulnerability content 110. Examples of the vulnerability content 110 are provided in an example prompt to the LLM 115 described in reference to FIG. 2.

At stage D, the prompt generator 113 receives the vulnerability content 110 and generates a prompt 112 for the LLM 115. The prompt 112 comprises task instructions for the LLM 115 to output a formatted description of a remediation action(s) for the vulnerability 124 based on the vulnerability content 110. The prompt 112 additionally describes a format of expected output for the LLM 115, for instance a JavaScript Object Notation (JSON) format and corresponding fields for expected output. An example prompt for the LLM 115 is provided in greater detail in reference to FIG. 2.

At stage E, the prompt generator 113 invokes the LLM 115 with the prompt 112 as input and the LLM 115 outputs a formatted description 114 of a remediation action(s) for the vulnerability 124. The LLM 115 can comprise the OpenAIR GPT-4® LLM, the Meta® Llama 3 LLM, etc., any known or trusted proprietary or open-source LLM, or any foundation model or language model capable of responding to prompts. Choice of the LLM 115 can depend on operational constraints such as available computing resources for generating formatted descriptions of remediation actions for vulnerabilities, desired accuracy of the formatted descriptions and explanations therein, etc.

The cleaning module 117 cleans the format and content of the formatted description 114 output by the LLM 115. The formatted description 114 comprises a description of a remediation action for each vendor/product and version range affected by the vulnerability 124. For instance, a remediation action is to upgrade software to a specified version or a version range that patches the vulnerability 124. The cleaning module 117 corrects format of the formatted description 114 and corrects/removes values of fields therein. For instance, the formatted description 114 can comprise JSON formatted text including an array, with each value of the array comprising name-value pairs related to a vendor/product, a version number or version number range, a patch version number that fixes the vulnerability 124, a reference URL for where the remediation action was retrieved, an explanation of the remediation action, etc. The cleaning module 117 verifies that each of these name value pairs are present (even if the value is empty or NULL) and that the JSON format has correct syntax. Additionally, the cleaning module 117 verifies that values are correct, e.g., that the patch version numbers are strictly greater than the version number or version number range for versions of the product exposed to the vulnerability.

If the cleaning module 117 identifies fields (e.g., name value pairs for a JSON format) that are missing in the formatted description, the cleaning module 117 adds these fields at the appropriate location (e.g., according to an ordering of the fields specified by the prompt 112) with empty or NULL values. The cleaning module 117 removes or corrects values for fields that are incorrect. For example, when a patch version number is less than or equal to the version number or version number range that the patch remediates, the patch version number can be removed. Additionally, the explanation can be removed or altered to indicate that no recommended remediation action is available. In some embodiments, when the cleaning module 117 determines that format and/or values of fields in the formatted description 114 are incorrect to an extent that is not correctible, the cleaning module 117 can flag the formatted description 114 for inspection by a domain level expert. As an additional operation after cleaning, the cleaning module 117 can convert the format of the formatted description 114 to a more interpretable format, for instance, by converting the formatted description 114 from JSON format to comma-separate values (CSV) format.

At stage F, if the cleaning module 117 successfully cleans the formatted description 114 to produce cleaned description 116, the cleaning module 117 communicates the cleaned description 116 to the vulnerability database 100 for storage. When the vulnerability database 100 receives a formatted description for storage, if a previous formatted description exists for a same vulnerability (e.g., when that formatted description was detected as outdated at stage A), the vulnerability database 100 replaces any old values in fields that have changed in the new formatted description with the new values.

The vulnerability documentation system 130 uses formatted descriptions stored in the vulnerability database 100 to populate templates for natural language descriptions of remediation actions of vulnerabilities. These templates have fields including CVE identifiers, remediation action explanations, version number upgrades, reference URLs, etc. for a remediation action in a user-friendly format (e.g., in an HTML document that can be rendered to a user). The vulnerability documentation system 130 then distributes the populated templates to users managing devices monitored by a cybersecurity organization. For each device, a user of the device is presented with a user interface element (e.g., via a software-as-a-service (SaaS) application of the cybersecurity organization) that enables navigation to a list of vulnerabilities for a device and a populated template describing a remediation action for each vulnerability.

Figure 2:
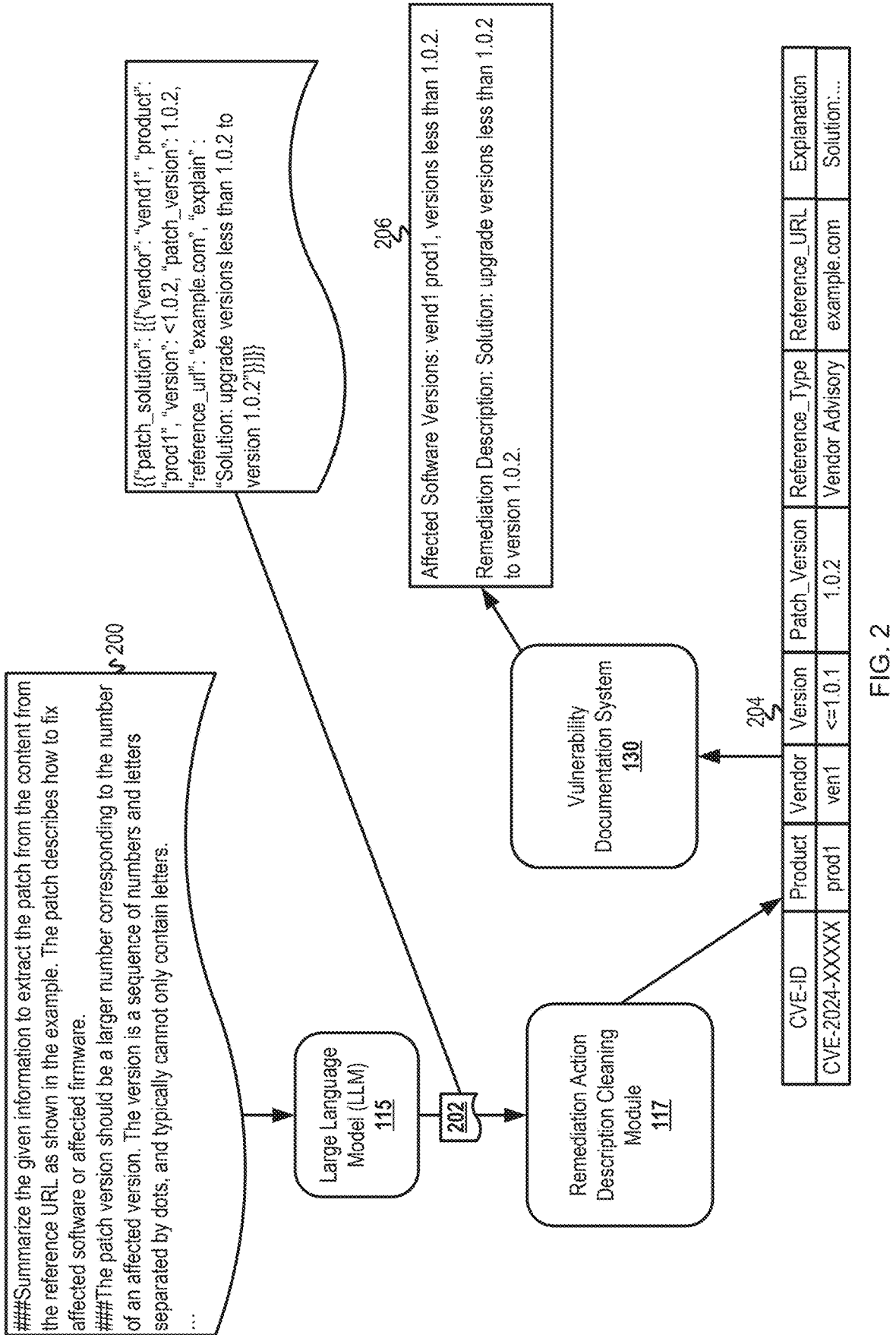
FIG. 2 is a schematic diagram of an example prompt to an LLM comprising instructions to generate a formatted description of a remediation action(s) for a vulnerability and example formatted descriptions/natural language descriptions.

FIG. 2 is a schematic diagram of an example prompt to an LLM comprising instructions to generate a formatted description of a remediation action(s) for a vulnerability and example formatted/natural language descriptions. The LLM 115 receives example prompt 200 as input and outputs an example formatted description 202. The cleaning module 117 receives the example formatted description 202 and outputs an example clean description 204. The vulnerability documentation system 130 uses the example clean description 204 to populate an example natural language description 206.

The example prompt 200 comprises the following text (truncated in FIG. 2):

Summarize the given information to extract the patch from the content from the reference URL as shown in the example. The patch describes how to fix a product, i.e., affected software or affected firmware.

The patch version should be a larger number corresponding to the number of an affected version. The version is a sequence of numbers and letters separated by dots, and typically cannot only contain letters.

Each vulnerability might have multiple patches corresponding to different affected versions. The product is also called a model sometimes. The format of the output should be a list of dictionaries. Each (vendor, product, version) tuple in your output must exactly match an item in the product CONFIGURATIONS list. Unmatched tuples should not appear in the output.

+−+−+−+−+−

8

Example

Input: "Here is a product CONFIGURATIONS list—[vendor:apple, product:mac_os_x, version: <10.14.3; vendor:apple, product:watch_os, version: <5.1.3; vendor:apple, product:iphone_os, version: <13.5.1; vendor:apple, product: ipados, version: <13.5.1;]. Content from reference url example.com is: About the security content of iOS 13.5.1 and iPadOS 13.5.1—Apple Support Apple Store Mac iPad iPhone Watch Vision AirPods TV & Home Entertainment Accessories Support 0+About the security content of iOS 13.5.1 and iPadOS 13.5.1 This document describes the security content of iOS 13.5.1 and iPadOS 13.5.1. About Apple security updates: For our customers' protection, Apple doesn't disclose, discuss, or confirm security issues until an investigation has occurred and patches or releases are available. Recent releases are listed on the Apple security updates page. Apple security documents reference vulnerabilities by CVE-ID when possible. For more information about security, see the Apple Product Security page. iOS 13.5.1 and iPadOS 13.5.1. Released Jun. 1, 2020. Kernel Available for: iPhone 6s and later, ipad Air 2 and later, iPad mini 4 and later, and iPod touch 7th generation. Impact: An application may be able to execute arbitrary code with kernel privileges. Description: A memory consumption issue was addressed with improved memory handling."

Output : {{"patch_solution": [{{"vendor": "Apple", "product": "iphone_os", "version": "<13.5.1", "patch_version": "13.5.1", "reference_url": "example.com", "explain": "...About the security content of iOS 13.5.1 and iPadOS 13.5.1 ..."}}, {{"vendor": "Apple", "product": "ipados", "version": "<13.5.1", "patch_version": "13.5.1", "reference URL": "example.com", "explain": "...About the security content of iOS 13.5.1 and iPadOS 13.5.1 ..."}}, {{"vendor": "Apple", "product": "watch_os", "version": "<5.1.3", "patch_version": "Not found", "reference_url": "example.com", "explain": " "}}, {{"vendor": "Apple", "product": "mac_os_x", "version": "<10.14.3", "patch_version": "Not found", "reference_url": "example.com", "explain": " "}}]}}

Example

Input: "Here is a product CONFIGURATIONS list—[vendor:fortinet, product:fortios—6k7k, version:6.2.4; vendor:fortinet, product:fortios, version: <=6.0.16; vendor: fortinet, product:fortiproxy, version: >=2.0.0, <=2.0.12; vendor:fortinet, product:fortios—6k7k, version:7.0.5] Content from reference url example.net is: Affected Products: FortiOS—6K7K version 6.2.4, FortiOS version 6.0.0 through 6.0.16. Solutions: Please upgrade to FortiOS-6K7K version 6.2.15 or above; Please upgrade to FortiOS version 6.0.17 or above."

Output : {{"patch_solution": [{{"vendor": "fortinet", "product": "FortiOS", "version": ">= 6.0.0, <=6.0.16", "patch_version": "6.0.17", "reference_url": "example.net", "explain": "...FortiOS version 6.0.0 through 6.0.16. Please upgrade to FortiOS version 6.0.17 or above..."}}, {{"vendor": "fortinet", "product": "FortiOS-6K7K", "version": "6.2.4", "patch_version": "6.2.15", "reference_url": "example.net", "explain": "...FortiOS-6K7K version 6.2.4. Please upgrade to FortiOS-6K7K version 6.2.15 or above..."}}]}}

Example

Input: "Here is the product CONFIGURATIONS list—[vendor:zyxel, product:atp100_firmware, version:>=4.32, <5.36; vendor:zyxel, product:atp100_firmware, version: 5.36;] Content from reference url example.org is: This cve's affected version is: ZLD V 4.32 to V5.36 Patch 1. Solution: upgrade to V5.36Patch2."

Output: {{"patch_solution": [{{"vendor": "zyxel", "product": "atp100_firmware", "version": ">=4.32, <5.36", "patch_version": "5.36 Patch 2", "reference_url": "example.org", "explain": "...ZLD V 4.32 to V5.36 Patch 1. Solution: upgrade to V5.36 Patch 2..."}}, {{"vendor": "zyxel", "product": "atp100_firmware", "version": "5.36", "patch_version": "5.36 Patch2", "reference_url": "example.org", "explain": "...ZLD V 4.32 to V5.36 Patch 1. Solution: upgrade to V5.36 Patch 2..."}}]}}}

Example

Input: ""
Output : {{"patch_solution": "Not found"}}
+-+-+-+-+-+-

{Vulnerability Content}

For the example prompt 200, the "{Vulnerability Content}" field comprises content crawled from the URL for the corresponding vulnerability from a trusted vulnerability cataloging website and content crawled from reference URLs that are referenced in the web page of the trusted vulnerability cataloging website (and, in some embodiments, URLs returned from a top-N Internet search of an identifier of the vulnerability) for remediating the vulnerability. The example prompt 200 provides example inputs and outputs including an empty input and corresponding output indicating that a patch solution (i.e., remediation action) is not found. Each input comprises a product configurations list that was obtained from crawling the trusted vulnerability cataloging website and content obtained from crawling the reference URL(s). Referring to FIG. 1, this comprises content obtained by the web crawler 101 from the trusted vulnerability cataloging website 104 and the product vendor reference website 106 inserted into the template "Here is the product CONFIGURATIONS list—{catalog website content} Content from reference url {reference URL} is: {reference URL content}".

Outputs indicated in the example prompt 200 include, for each product/vendor and version number or range of version numbers, JSON formatted text including fields for an identifier of the vendor, an identifier of the product, an affected version number or version number range, a patch version number, a reference URL where the remediation action description was retrieved, and an explanation of the remediation action. The example formatted description 202 conforms to this format and comprises the text: {{"patch_solution": [{{"vendor": "vend1", "product": "prod1", "version": <1.0.2, "patch_version": 1.0.2, "reference_url": "example.com", "explain": "Solution: upgrade versions less than 1.0.2 to version 1.0.2"}}]}}

Because the values of fields in the example formatted description 202 are correct (in particular, the patch version number is greater than the range of affected version number) and the fields are all present, the cleaning module 117 does not remove or alter any fields or values of the example formatted description 202. Rather, the cleaning module 117 converts the JSON format of the example formatted description 202 into the CSV format of the example clean description 204 while adding the fields "CVE-ID" and "Reference-_Type". The reference type can be determined based on the reference URL used to generate the example prompt 200, for instance by determining that a top-level domain of the reference URL is for a vendor. If, by contrast, certain values were incorrect such as the patch version number being 1.0.0, the cleaning module 117 would remove this value and replace the explanation to indicate that a remediation action description is not available.

The example natural language description 206 output by the vulnerability documentation system 130 comprises the text:

Affected Software Versions: vend1 prod1, versions less than 1.0.2.

Remediation Description: Solution: upgrade versions less than 1.0.2 to version 1.0.2.

In some embodiments, the vulnerability documentation system 130 can generate natural language descriptions of remediation actions using a template with fields to insert software/firmware configurations for affected software/firmware, patch versions, and descriptions. In other embodiments, the vulnerability documentation system 130 can prompt an LLM with instructions to generate natural language descriptions of the remediation actions for the vulnerabilities using corresponding clean descriptions.

FIGS. 3-4 are flowcharts of example operations. The example operations are described with reference to a vulnerability documentation system, a vulnerability database, a web crawler, a web page parser, a prompt generator, an LLM, and a cleaning module for consistency with the earlier figures and/or ease of understanding. The names chosen for the program code are not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for generating a formatted description of a remediation action(s) for a vulnerability with extracted vulnerability remediation content and an LLM. At block 300, the vulnerability documentation system detects a vulnerability having an undocumented or outdated remediation action description in the vulnerability database. The vulnerability documentation system can maintain the vulnerability database by periodically identifying vulnerabilities having remediation action descriptions that are sufficiently old (e.g., over a month, six months, etc.), e.g., by searching an index of when vulnerabilities are first logged in the vulnerability database. Vulnerabilities having entries logged outside the time period for being sufficiently old can be detected as outdated. For detecting undocumented vulnerabilities, the web crawler can periodically crawl a website that catalogs new vulnerabilities to retrieve identifiers for newly cataloged vulnerabilities since the last crawling instance and the vulnerability documentation system can detect these new vulnerabilities as having undocumented remediation action descriptions.

At block 302, the web crawler crawls a URL for a trusted vulnerability cataloging website corresponding to an identifier of the detected vulnerability for configuration data. The configuration data comprises (vendor, product, version) tuples for products and corresponding versions affected by the vulnerability. The version entry in a tuple can comprise a version number or a range of version numbers. For example, the trusted vulnerability cataloging website can comprise the NVD website maintained by the NIST. The web crawler can identify the URL to crawl according to known URL paths for the trusted vulnerability cataloging website. As an example, the trusted vulnerability cataloging website may use the URL "example.com/path/CVE-ID" for the web page describing configuration data for the vulnerability with identifier "CVE-ID" and the web crawler can crawl according to this known URL path. When encountered, the web crawler extracts configuration data while crawling the URLs.

At block 304, the web crawler crawls URLs for web pages linked in the trusted web page from the trusted vulnerability cataloging website for descriptive content of a remediation action(s) for the vulnerability. The linked web pages are trusted by association with the trusted vulnerability cataloging website and are typically web pages of vendors describing patches of software/firmware versions that remediate the vulnerability. As with the configuration data, the web crawler extracts descriptive content when encountered while crawling.

At block 306, the web crawler searches the Internet with the vulnerability identifier and then crawls URLs for the top-N web pages for additional descriptive content of the remediation action(s). For instance, the web crawler can invoke a search engine to identify URLs for the top-N web pages. Block 306 is depicted with a dashed line to indicate that these operations are optional. Crawling the top-N web pages potentially yields additional content to describe the remediation action(s) at the cost of additional crawling resources and downstream resources when generating formatted descriptions from the additional content.

Blocks 308 and 310 are performed by a web page parser 301. The web page parser 301 can comprise separate modules to perform the parsing at each of the blocks 308, 310. For instance, because the parsing at block 308 is based on known format of web pages from the trusted vulnerability cataloging website, the module for parsing at block 308 can apply rules or use regular expressions according to this known format. By contrast, the parsing at block 310 can use generic parsing modules for extracting and parsing data from HTTP responses. More generally, the web page parser 301 is malleable to adding/removing modules according to sources/type of crawled content.

At block 308, the web page parser 301 parses configuration data for the trusted web page included in a corresponding HTTP response based on known format of the HTTP response. As an example, web pages for the trusted vulnerability cataloging website can be known to have HTML elements with the header "Known Affected Software Configurations" comprising tables with the configuration data. The web page parser 301 can use a regular expression to identify these HTML elements and extract the configuration data therein.

At block 310, the web page parser 301 parses HTTP responses from the linked web pages and (optionally) the top-N web pages according to content formats indicated in the HTTP responses to obtain descriptive content of the remediation action(s). The web page parser 301 can parse the HTTP responses with separate parsing modules for JavaScript, HTML, and PDF formats.

At block 312, the prompt generator generates a prompt with the parsed content. The prompt comprises natural language instructions directing or instructing a language model to output a formatted description of a remediation action(s) for the vulnerability. The prompt indicates fields to include in the formatted description such as affected software/firmware configurations, patch software/firmware versions, explanations of the remediation action(s), reference URLs that describe the remediation action, etc. The prompt can also provide examples of input/output pairings comprising parsed content (input example) and formatted descriptions (output example), and the examples can include an example for when there is no input and a corresponding output indicating no known remediation action. The prompt generator can generate the prompt by inserting the parsed content into a prompt template with fields indicating where to insert configuration data in the parsed content and where to insert descriptive content of the remediation action(s) in the parsed content.

At block 314, the prompt generator prompts the LLM to output a formatted description of the remediation action(s) for the vulnerability and the cleaning module cleans the formatted description. The system submits the generated prompt to the LLM and passes the LLM output/answer to the cleaning module. The cleaning module cleans the formatted description by verifying that all prescribed fields (e.g., affected software/firmware configurations, patch software/firmware configurations, etc.) are included and that values of each field are correct. Incorrect values can comprise patch version numbers that are less than or equal to affected version numbers for software/firmware affected by the vulnerability. The cleaning module can remove incorrect values, add missing fields with empty or NULL values, and remove extraneous fields. The cleaning module can additionally convert the format of the formatted description for storage, for instance by converting from a JSON format to a CSV format. In some instances, the cleaning module may not be able to clean the formatted description when the LLM severely hallucinates, for instance when the formatted description has a completely uninterpretable format. If the cleaning module is able to successfully clean the formatted description, operational flow proceeds to block 318. Otherwise, operational flow proceeds to block 320.

At block 318, the vulnerability documentation system stores the cleaned description in the vulnerability database. If an entry exists for the vulnerability (e.g., when the remediation action(s) description was detected as outdated), the vulnerability database can replace the entry with the cleaned description. The operational flow in FIG. 3 is complete.

At block 320, the vulnerability documentation system flags the formatted description for inspection/correction. In some embodiments, the vulnerability documentation system can replace the formatted description with a formatted description that indicates that no remediation action(s) is known for the affected software/firmware configurations and can store that formatted description in the vulnerability database.

FIG. 4 is a flowchart of example operations for populating and distributing natural language descriptions of remediation actions for vulnerabilities. At block 400, the vulnerability documentation system generates/updates formatted descriptions of remediation actions for vulnerabilities stored in the vulnerability database. As the vulnerability documentation system detects vulnerabilities having undocumented or outdated remediation action descriptions, the vulnerability documentation system uses web crawling and the LLM to generate corresponding formatted descriptions, for instance as described in the foregoing in reference to FIG. 3. Block 400 is depicted with an arc arrow to indicate that generating and updating of formatted descriptions is ongoing as vulnerabilities having outdated or undocumented remediation action descriptions are detected. This occurs independently of the remaining operations in FIG. 4 for distributing the formatted descriptions.

At block 402, the vulnerability documentation system determines whether description push criteria for pushing descriptions of remediation actions for vulnerabilities are satisfied. The description push criteria can comprise that a threshold amount of time has elapsed since the descriptions were last pushed, that a threshold number of (or any) new descriptions have been generated, etc. If the description push criteria are satisfied, operational flow proceeds to block 404. Otherwise, operational flow returns to block 400 for generating/updating additional descriptions of remediation actions.

At block 404, the vulnerability documentation system populates natural language descriptions of remediation actions based on the most recently generated/updated formatted descriptions. The vulnerability documentation system can maintain a data structure that indicates identifiers of vulnerabilities for which formatted descriptions have been generated/updated since the most recent push, and natural language descriptions can be populated for these vulnerabilities. The natural language descriptions can be populated using a template that indicates fields for configuration data and descriptive content stored in corresponding formatted descriptions.

At block 406, the vulnerability documentation system pushes/distributes the natural descriptions to affected devices. For instance, a cybersecurity organization can maintain an index of vulnerability identifiers that returns affected devices for each vulnerability. The vulnerability documentation system can perform a lookup for each vulnerability identifier stored in the aforementioned data structure and can push the corresponding natural language description to the device returned from the lookup. In other embodiments, "pushing" or "distributing" the natural language descriptions can comprise providing a SaaS application access to the natural language descriptions, wherein the SaaS application is running on affected devices and retrieves natural language descriptions for each vulnerability at each affected device.

Variations

The foregoing description refers to an LLM as being prompted to output formatted descriptions of remediation actions for vulnerabilities. Alternatively, any foundation model or language model capable of generating responses to inputs that at least partially comprise natural language can be instead implemented.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in block 400 can be performed in parallel or concurrently across vulnerabilities. With respect to FIG. 3, crawling URLs for the top-N web pages is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 5:
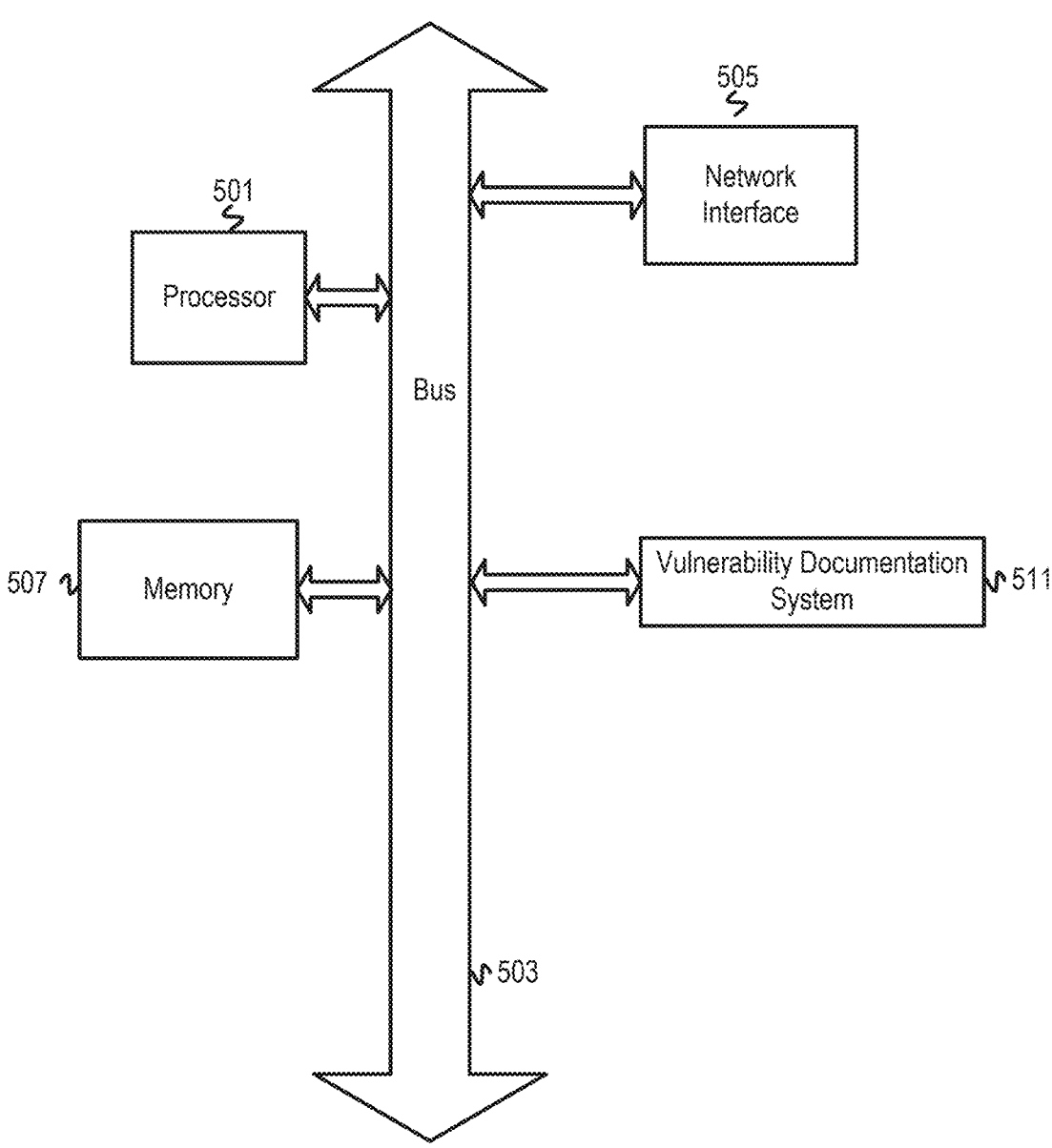
FIG. 5 depicts an example computer system with a vulnerability documentation system.

FIG. 5 depicts an example computer system with a vulnerability documentation system. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a vulnerability documentation system 511. The vulnerability documentation system 511 detects vulnerabilities having outdated or undocumented descriptions of remediation actions and crawls the Internet for configuration data of affected software/firmware and for descriptive content of remediation actions for each detected vulnerability. The vulnerability documentation system 511 uses the configuration data and descriptive content to generate prompts comprising task instructions to generate formatted descriptions of remediation actions for vulnerabilities. The vulnerability documentation system 511 prompts an LLM with the prompts to obtain formatted descriptions of the vulnerabilities. The vulnerability documentation system 511 then uses the formatted descriptions to generate natural language descriptions of remediation actions and pushes the natural language descriptions to devices affected by corresponding vulnerabilities. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
based on detecting a first vulnerability not having a formatted description of first one or more remediation actions for software affected by the first vulnerability, retrieving configuration data for software and website content describing the first one or more remediation actions,
wherein retrieving the website content comprises,
crawling a trusted uniform resource locator (URL) known to describe a remediation for the first vulnerability; and
processing at least one of JavaScript® content, HyperText Markup Language content, and Portable Document Format content in one or more HyperText Transfer Protocol responses from the trusted URL;
generating a prompt comprising the configuration data, the website content, example configuration data and example website content for second one or more vulnerabilities, and example formatted descriptions of second one or more remediation actions for software affected by each of the second one or more vulnerabilities, wherein the prompt comprises a set of one or more task instructions to generate a formatted description of the first one or more remediation actions;
prompting a foundation model with the prompt to obtain a formatted description of the first one or more remediation actions; and

storing the formatted description of the first one or more remediation actions in association with the first vulnerability.
2. The method of claim 1, further comprising generating a natural language description for the first one or more remediation actions based, at least in part, on the formatted description of the first one or more remediation actions.
3. The method of claim 1, wherein the formatted descriptions of the second one or more remediation actions comprise indications of vendors, products, and product versions for affected software products and vendors, and product versions for patched software products.
4. The method of claim 3, wherein the prompt indicates that version numbers for product versions of affected software products are to be less than version numbers for product versions of patched software products indicated in the formatted description of the first one or more remediation actions.
5. The method of claim 3, further comprising, based on a determination that, in the formatted description of the first one or more remediation actions, a product version indicated for an affected software product is less than a product version indicated for a patched software product, at least one of cleaning the formatted description of the first one or more remediation actions and blocking the formatted description of the first one or more remediation actions from storage.
6. The method of claim 1, wherein the trusted URL comprises a URL for a vendor associated with the software affected by the first vulnerability.
7. The method of claim 1, wherein the formatted descriptions of the first one or more remediation actions and the second one or more remediation actions are in the JavaScript® Object Notation format.
8. The method of claim 1, wherein the foundation model comprises a large language model.
9. A non-transitory machine-readable medium having program code stored thereon, the program code comprising instructions to:
detect a first vulnerability having at least one of undocumented and outdated formatted descriptions for first one or more remediation actions of the first vulnerability;
retrieve configuration data for affected software and website content describing the first one or more remediation actions, wherein the instructions to retrieve the website content comprise instructions to,
crawl a trusted uniform resource locator (URL) known to describe a remediation for the first vulnerability; and
process at least one of JavaScript® content, HyperText Markup Language content, and Portable Document Format content in one or more HyperText Transfer Protocol responses from the trusted URL;
generate a prompt comprising a set of one or more task instructions to generate a formatted description of the first one or more remediation actions based, at least in part, on the configuration data and the website content;
prompt a foundation model with the prompt to obtain a formatted description of the first one or more remediation actions; and
store the formatted description of the first one or more remediation actions in association with the first vulnerability.
10. The non-transitory machine-readable medium of claim 9, wherein the program code further comprises instructions to generate a natural language description for the first one or more remediation actions based, at least in part, on the formatted description of the first one or more remediation actions.

11. The non-transitory machine-readable medium of claim 9, wherein the prompt comprises example configuration data and website content for second one or more vulnerabilities, and example formatted descriptions of second one or more remediation actions for software affected by each of the second one or more vulnerabilities.

12. The non-transitory machine-readable medium of claim 11, wherein the formatted descriptions of the second one or more remediation actions comprise indications of vendors, products, and product versions for affected software and vendors, products, and product versions for patched software products.

13. The non-transitory machine-readable medium of claim 9, wherein the formatted description of the first one or more remediation actions is in the JavaScript® Object Notation format.

14. The non-transitory machine-readable medium of claim 9, wherein the foundation model comprises a large language model.

15. An apparatus comprising:

a processor; and a machine-readable medium having instructions stored thereon that are executable by the processor to cause the apparatus to, detect vulnerabilities having at least one of undocumented and outdated formatted descriptions for corresponding remediation actions;

retrieve configuration data for software affected by the detected vulnerabilities and descriptive content for remediation actions for the detected vulnerabilities, wherein the instructions to retrieve the descriptive content comprise instructions executable by the processor to cause the apparatus to, crawl a first trusted website known to describe a remediation for the detected vulnerabilities; and process at least one of JavaScript® content, HyperText Markup Language content, and Portable Document Format content in one or more HyperText Transfer Protocol responses from the first trusted website; and for each vulnerability of the detected vulnerabilities, generate a prompt comprising one or more task instructions to generate a formatted description of first one or more remediation actions for the vulnerability based, at least in part, on retrieved configuration data and retrieved descriptive content for the vulnerability;

prompt a foundation model with the prompt to obtain the formatted description; and store the formatted description in association with the vulnerability.

16. The apparatus of claim 15, wherein the machine-readable medium further has stored thereon instructions executable by the processor to cause the apparatus to:

generate natural language descriptions from the formatted descriptions for remediation actions of the detected vulnerabilities; and push the natural language descriptions to devices affected by corresponding ones of the detected vulnerabilities.

17. The apparatus of claim 15, wherein the prompt comprises example configuration data and descriptive content for second one or more vulnerabilities, and example formatted descriptions of second one or more remediation actions for at least one of software affected by each of the second one or more vulnerabilities.

18. The apparatus of claim 15, wherein the instructions to retrieve the descriptive content comprise instructions executable by the processor to cause the apparatus to, crawl a second trusted website known to describe remediations for the vulnerabilities, wherein the second trusted website is indicated in web pages of the first trusted website; and process HyperText Transfer Protocol (HTTP) responses from the second trusted website to obtain the descriptive content.

19. The apparatus of claim 15, wherein the formatted description of the first one or more remediation actions is in the JavaScript® Object Notation format.

20. The apparatus of claim 15, wherein the foundation model comprises a large language model.

\* \* \* \* \*